United States Patent [19]

Hankosky et al.

[11] 4,257,714
[45] Mar. 24, 1981

[54] DEVICE FOR COUPLING A PAIR OF RODS

[75] Inventors: Andrew Hankosky; Robert L. Clapper; Earl A. Bake, all of Pittsburgh, Pa.

[73] Assignee: Rockwell International Corporation, Pittsburgh, Pa.

[21] Appl. No.: 884,091

[22] Filed: Mar. 6, 1978

[51] Int. Cl.² .................... F16D 3/80; F16L 17/00
[52] U.S. Cl. ................................. 403/31; 403/335
[58] Field of Search ............ 403/15, 31, 32; 251/54, 251/48, 330

[56] References Cited

U.S. PATENT DOCUMENTS 4,103,849   8/1978   Holt et al. ..................... 403/15 X

FOREIGN PATENT DOCUMENTS 1008218   10/1965   United Kingdom ............. 403/31

Primary Examiner—Wayne L. Shedd

[57] ABSTRACT

A coupling is mounted between a valve stem of a valve and a rod of a valve actuator. The rod includes an extension having a piston member at the end thereof which is received within a cylinder member mounted on the end of the valve stem. The extension and piston member thereof define with the cylinder member a chamber within the cylinder member. Force can be transmitted from the rod to the stem by full insertion of the piston member within the cylinder member. A pressurized gas is contained within the chamber to limit the force transmitted from the rod to the stem when the relative position of the rod with respect to the stem causes the piston member to be located intermediate of the cylinder member.

5 Claims, 3 Drawing Figures

DEVICE FOR COUPLING A PAIR OF RODS

BACKGROUND OF THE INVENTION

1. Field of the Invention

This invention relates to a device for coupling a pair of rod elements and, more specifically, to such a device which can be utilized to limit the amount of force applied to a stem of a valve during backseating when the rod of a valve actuator acts on the valve stem to open the valve.

2. Description of the Prior Art

There have heretofore been utilized a number of means for opening and closing large valves in the feedwater and steam systems of nuclear power plants. One such means which is frequently used is a valve actuator which incorporates a hydraulic cylinder and a gas accumulator. Hydraulic oil is directed to a piston within the hydraulic cylinder to open the valve in opposition to a precharged source of high pressure gas in an accumulator which gas acts on the other side of the piston. The high pressure gas maintained in the accumulator is of a sufficient quantity and pressure to act on the piston to rapidly close the valve when the hydraulic pressure is relieved. Some valve configurations require a hydraulic pressure which is significantly higher than that of the high pressure gas to provide enough force to initially lift the closure member from its seat. Employing the hydraulic pressure at such a high level could result in backseating damage if some means were not utilized to limit the force during backseating.

In other valve configurations where such a large force is not required to lift the closure member from the seat, pressure limiting means, such as a hydraulic accumulator, or a relief valve, on the hydraulic system which provides the hydraulic pressure for opening the valve, may be set at a level to properly backseat the valve when the piston is in an upward position. The resulting force acting on the stem, the difference between the hydraulic force upward and the gas force downward, is maintained to ensure proper backseating without damaging the valve. However, should a leak in or a rupture of the accumulator occur, the force generated by the hydraulic oil would no longer be opposed by the high pressure gas. Were this force to be transmitted to the backseat of the valve through the stem, permanent valve damage might occur. Although it is less likely to occur, the same detrimental results might be obtained with failure of the hydraulic pressure limiting means.

A concern for and a consideration of the amount of force applied to a valve during backseating has also affected the operation of other forms of valve actuators. Although they are not capable of closing this type of large valve as rapidly as can the accumulator described hereinabove, electric motor operators are frequently employed for valve operation in nuclear power plant systems. To close a valve with an electrical motor operator, a remote signal is sent to the motor to cause gear rotation in one direction to lower the rod. The motor gearing includes a torque limit switch which is contacted during a predetermined torque condition within the gearing so that when the rod has acted on the stem to fully seat the valve, motor power is discontinued by the torque limit switch. Motor operation is, therefore, automatically stopped when the valve is fully closed. It would seem that a similar torque limit switch could be employed in the motor gearing when the valve is opened. The motor would again stop when the valve is backseated as an increase in torque would again turn off the electrical motor. However, the level at which such a torque limit switch would be set to prevent damage during backseating would limit the torque throughout operation of the electrical motor operator while opening the valve. But it is often found that a significantly higher torque is needed simply to initially open the valve. A torque limit switch with such a setting would, therefore, prevent the valve from being opened by disconnecting the motor prior to any upward movement of the stem. Consequently, it is presently the practice in the operation of the electrical motor operator during opening of the valve to provide a position limit switch for stopping the motor just prior to backseating of the valve. A handwheel is provided for manually applying the proper torque to fully backseat the valve.

Last, but by no means least, there exist valve actuators which are operated by hydraulic oil which acts on both sides of a piston to position the valve. The use of hydraulic oil pressure to open the valve, without a controlled pressure on the other side of the piston in opposition thereto, has generally produced forces which are unsatisfactory for backseating the valve. Consequently, valves operated by a hydraulic actuator have not heretofore been provided with any simple, automatic means for backseating.

To provide some control of the forces being transmitted to a valve by an actuator during backseating, there has heretofore been disclosed a coupling of the type included in U.S. patent application Ser. No. 663,786, filed on Mar. 4, 1976 by Timothy Edward Kunkle and assigned to the assignee of this application. These couplings basically utilize a spring member to bias a pair of lost motion fittings mounted on the ends of the rod and the stem. Although these prior art devices can be properly employed for this purpose, the basic design employed requires one or more Belleville springs which are generally expensive to provide and lack a desired flexibility since specific springs may be required for each specific valve configuration.

SUMMARY OF THE INVENTION

It is, therefore, an object of this invention to provide means for applying an adequate but limited force to a valve stem by a valve actuator while ensuring proper backseating of the valve without any damage thereto.

It is another object of the invention to provide a device for coupling the valve stem and the rod actuator which utilizes a pressurized fluid to provide the desired force required for backseating.

It is a further object to provide a device of the type described which can be utilized on different valve configurations while still being simple to operate and inexpensive to provide.

These and other objects of the invention are provided by the preferred embodiment thereof in the form of a device for operably coupling a first rod to a second rod having a common axis and being capable of movement along the axis for transmitting force therebetween. The device includes an extension of the first rod which has an intermediate portion with an exterior surface which is parallel with the axis and an end portion extending radially from the exterior surface to define a piston member. A cylinder member is mounted at the end of the second rod and includes a cylindrical wall that extends by the piston member for sliding, sealed contact therebetween and has an end thereof remote from the second rod which includes an opening therethrough. The intermediate portion of the extension is received within the opening for sliding, sealed contact between the exterior surface and an interior surface of the opening. The extension of the first rod and the cylinder member have mating surfaces thereon which are transverse to the axis for engagement therebetween to establish a maximum axial distance between the rods. A chamber within the cylinder member is defined by the cylindrical wall, the end of the cylinder, the exterior surface and a first side of the piston member. The piston member has a second side thereof which is capable of engaging a contact surface relative to the end of the second rod to establish a minimum axial distance between the rods. There is included means for filling the chamber with pressurized compressible fluid for biasing the first rod toward the second rod and for limiting the tensile force being transmitted from the first rod to the second rod when a relative distance therebetween is less than the maximum axial distance and greater than the minimum axial distance.

DESCRIPTION OF THE INVENTION

Figure 1:
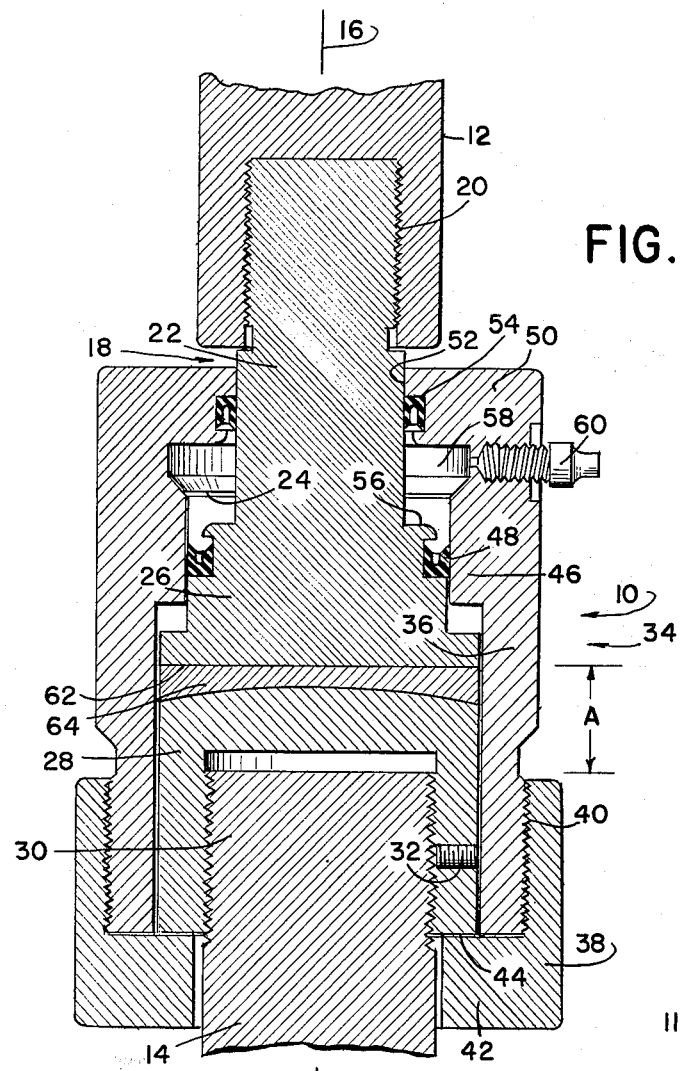
FIG. 1 is a sectional side view of the preferred device for coupling a rod and a stem including various features of the invention and shown in a position where there is a minimum axial distance between the rod and stem.

As seen in FIG. 1, the preferred device 10 for coupling a rod 12 of a valve actuator (not shown) to a valve stem 14, which is also a rod like member, of a valve (not shown) is disposed therebetween in general alignment with an axis 16 which is common to both the rod 12 and the stem 14. It will be seen that when explaining the device 10 general reference will be made to portions thereof relating to the rod 12 or the stem 14. However, the device 10 and its components may be reversed in position relative to the rod 12 and the stem 14 without altering its function so that the invention is not limited to the particular arrangement shown.

In the preferred embodiment, the rod 12 includes an extension 18 thereof which is threadedly mounted thereon (as shown at 20). An intermediate portion 22 of the extension 18 includes an exterior surface 24 which is parallel with the axis 16. Although in the preferred embodiment the intermediate portion 22 is cylindrical in shape, it will be seen that any portion having a uniform cross section along its length might be provided if proper sealing (as will be discussed later) can be provided therefor.

The extension 18 further includes an end portion in the form of a piston member 26 which extends radially from the surface 24 to have a larger diameter than does the intermediate portion 22.

The stem 14 is provided an end fitting 28 which is threadedly received on the end 30 of the stem 14 and will be retained thereon by a set screw configuration 32. Additionally, a cylinder member 34 is mounted relative the end 30 of the stem 14 by including a cylinder body 36 and a coupling ring 38. The coupling ring 38 and cylinder body 36 are joined at threads 40 and entrap the end fitting 28 of the stem 14 as a radial portion 42 of the coupling ring 38 closely encircles the stem 14. General contact between the end fitting 28 and the radial portion 42 of the coupling ring 38 is made at 44. Contact at 44, it will be seen, will be maintained throughout valve operation and the transmittal of force between the rod 12 and the stem 14 but radial sliding contact between the end fitting 28 and the coupling ring 38 at 44 will accommodate alignment of the rod 12 and the stem 14 throughout valve operation. The cylinder body 36 of the cylinder member 34 includes a cylindrical wall portion 46 adjacent to and extending by the outer periphery of the piston member 26. Accordingly, sliding contact is provided between the periphery of the piston member 26 and the cylinderical wall portion 46 and a sealing 48 mounted therebetween.

The cylinder body 36 further includes an end 50 which has an opening 52 therethrough. The intermediate portion 22 of the extension 18 is received within the opening 52 for sliding contact between the interior surface of the opening 52 and the exterior surface 24. Again, a sealing ring 54, similar to sealing ring 48, is provided therebetween.

Accordingly, the exterior surface 24, a first side 56 of the piston member 26, the interior surface of the cylinderical wall portion 46 and the end 50 of the cylinder member 34 define a chamber 58 which is sealed and capable of changing volume as the axial distance between the rod 12 and the stem 14 is altered. To employ the chamber 58 to control the force being transmitted from the rod 12 to the stem 14, a fluid charging valve 60 is provided. The fluid charging valve is utilized to introduce a pressurized compressible fluid to the chamber 58 for preloading the device 10 as will be explained in detail hereinbelow.

As has thus far been explained, the preferred device 10 for coupling the rod 12 and the stem 14 includes a means for limiting the tensile force transmitted between the rod 12 and the stem 14 when the axial distance therebetween is such that the pressurized compressible fluid in the chamber 58 produces biasing between the rod and stem. However, a full explanation of the operation of the device 10 during opening and closing of a valve is in order for a better understanding of how it will function. During closing of the valve in this preferred embodiment, the rod 12 will move downward to transmit force to the stem 14. A second side 62 of the piston member 26 of the extension 18 will make contact with an alignment disc 64, which, in turn, makes contact with the end fitting 28. Therefore, as seen in FIG. 1, the distance between the rod 12 and the end 30 of the stem 14 during closing is shown at A and this distance is the minimum axial distance which can be obtained between the rod and stem when the device 10 is being utilized. The alignment disc 64 is generally free to float on the convex upper surface of the end fitting 28 to insure proper alignment between the rod 12 and the stem 14 when compressive force is being applied therebetween. This alignment is made possible, as mentioned above, by the sliding contact which may occur between the end fitting 28 and the coupling ring 38 at the surfaces at 44. When the valve is being opened (when it has been obviously removed from its seat) and no appreciable flow forces are being applied to the closure member, the pressurized fluid within the chamber 58 will apply a force to the rod 12 and the stem 14 which will cause their relative positions to be maintained at this minimum distance A.

Figure 2:
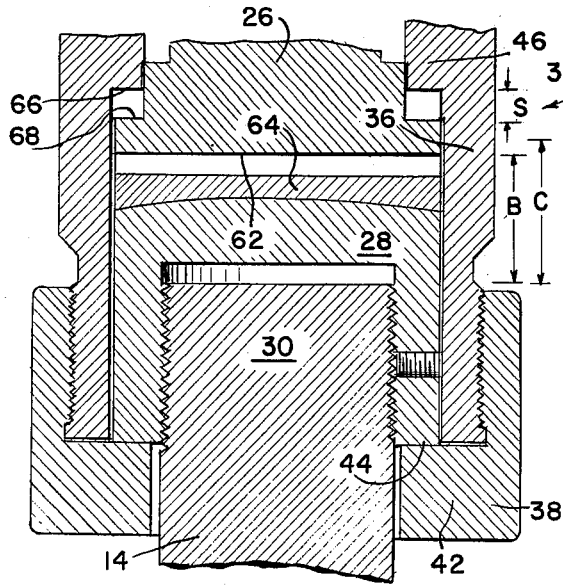
FIG. 2 is a sectional side view of the coupling as shown in FIG. 1, showing the relative position of the rod and the stem when the valve is being backseated.

However, as seen in FIG. 2, when the valve is backseated, the general spacing between the valve and the actuator is such that the stem 14 will be restricted in its upward movement. Further upward movement of the actuator causes the rod 12 to come to rest within the actuator where it will be displaced from the end 30 of the stem 14 to an axial distance as shown at B. In this position, the pressurized fluid within the chamber 58 acts on the piston member 26 and the cylinder member 34 to determine the level of force being transmitted from the rod 12 to the stem 14. During the initial set up of the actuator-valve configuration the spacing of the various elements of the actuator and the valve is determined to insure that this general position is obtained during backseating while the rod 12 is being held upwardly against a stop in the actuator.

However, there is a condition which has not yet been discussed which is of significance during initial opening of the valve. When a large valve is fully seated in a flow line, the liquid in the line creates significant force on the closure member and the initial force required to remove the closure member from the seated position is significantly larger than the force desired for backseating as described above. Accordingly, in some configurations, force being applied to unseat a valve would attempt to displace the rod from the stem and greatly decrease the volume of the chamber 58. It would thus be possible to significantly raise the pressure of the fluid therein to a level which would highly complicate sealing requirements for the chamber 58. Therefore, since there is no objection to transmitting these higher forces between the rod 12 and the stem 14 except during a backseated condition, a pair of mating surfaces 66, 68 are provided to the cylinder member 34 and piston member 26 respectively.

As seen in FIG. 2, these surfaces are generally perpendicular to the axis 16 but are not caused to make contact when the valve is backseated. However, during initial opening of the valve the force transmitted between the rod 12 and the stem 14 is significantly higher than the resistance afforded by the pressurized fluid within the chamber 58 so that the rod 12 will be further displaced from the stem 14 by the distance S to bring the mating surfaces 66, 68 into contact. The abutting contact thus provided allows force applied to the rod 12 to be directly transmitted to the stem 14 for proper unseating of the valve. It can be seen that in this condition the chamber 58 is still provided with an adequate volume to prevent an excessive build up of pressure by the pressurized fluid. Accordingly, when the mating surfaces 66, 68 are engaged, the distance between the second side 62 of the piston member 26 and the end 30 of the rod 12 is shown at C (distance B plus distance S) and this distance is the maximum axial distance that can be established between the rod and the stem during valve operation.

As a result, if the distance between the rod 12 and the stem 14 is greater than the minimum axial distance A and is less than the maximum axial distance C the force being transmitted between the rod 12 and the stem 14 is determined by the pressure of the pressurized fluid operating within the chamber 58.

Figure 3:
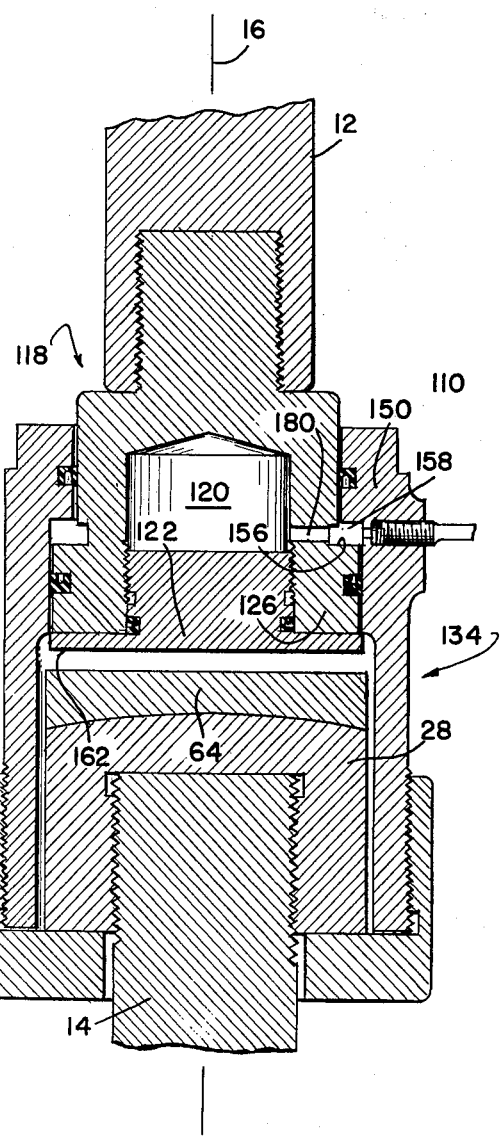
FIG. 3 is a sectional side view of an alternative embodiment of the invention shown with the rod and stem in a relative position as would be required during backseating.

As seen in FIG. 3, there is provided an alternative embodiment of the invention in the form of a device 110 which can similarly couple a rod 12 and stem 14 aligned with an axis 16. The extension 118 of the rod 12 is similar to that described above but further includes a fluid reservoir 120 formed in its interior. The fluid reservoir 120 is generally defined by a cavity formed within the extension 118 and a threaded, sealed cap element 122 mounted on the extension 118 to generally provide the second side 162 of the piston member 126.

The stem 14 includes an end fitting 28 for mounting of a cylinder member 134 similar to that described hereinabove. However, it can be seen that in this embodiment the piston member 126 and the cylinder member 134 are not provided with mating surfaces of the type shown as surfaces 66, 68 in FIGS. 1 and 2. By providing a fluid reservoir 120 and a passage 180 from the reservoir to a chamber 158 between the extension 118 and the cylinder member 134, a means is provided to limit the build up of pressure which can be obtained during relative displacement of the rod 12 and the stem 14 which causes a decrease of the volume in the chamber 158.

Therefore, since the pressurized fluid may pass through passage 180 into the fluid reservoir 120 during separation of the rod 12 and the stem 14, the fluid pressure will not increase to a level which would highly complicate sealing. As a result, during initial opening of the valve while utilizing the device 110 the upward movement of the rod 12 from the stem 14 will decrease the size of the chamber 158 until the first side 156 of the piston member will make contact with the end 150 of the cylinder member 134 to provide the function described for the "mating surfaces 66, 68" of FIGS. 1 and 2 above. Obviously, after the closure member of the valve is removed from its seat, the force being transmitted between the rod 12 and the stem 14 will be greatly reduced to allow the pressurized fluid to decrease the axial distance between the rod 12 and the stem 14 as the second side 162 of the piston member 126 again makes contact with an alignment disc 64 in a manner which was previously discussed.

Although the devices 10 and 110 might be utilized for any type of valve independent of size, it is presently being considered for globe valves and gate valves ranging from 6 inches to 28 inches. However, it would be helpful to present some dimensions and quantities expected for a typical valve configuration. It has, for example, been determined that for a 16 inch gate valve the desired backseating force could range between 11,000 and 12,000 pounds. To provide this desired force, a first side of the piston member might be designed to include a surface area of about 5 square inches. By precharging the chamber with nitrogen, a fluid which has been found to work satisfactorily, to a level of about 2,000 p.s.i., it can be seen that the decrease in the volume of the chamber during backseating will cause the nitrogen to obtain a pressure of about 2,200 to 2,400 p.s.i. The system would still work satisfactorily if the environmental temperature at the installation were to be quite high causing the precharged nitrogen to reach a level of about 3,000 p.s.i. Obviously, this would increase the backseating force but this higher force would be within the design parameters of the valve configuration.

A typical hydraulic system being used to operate a 16 inch gate valve would be expected to operate at a hydraulic pressure as high as 4,500 p.s.i. This level of pressure is sufficient to create an opening force (that needed to lift the gate initially off the seat) in the range of 130,000 to 140,000 pounds of force. With this level of force being transmitted from the rod to the stem, the "mating surfaces" in the device would be engaged for full transmission of the force between the rod and the stem in the manner described hereinabove.

As thus explained, the preferred and alternative embodiments of the invention enable the rod to transfer large forces to the stem but control the force which is being transferred to the stem during backseating of the valve. The embodiments shown might obviously be altered and still be seen to fall within the scope of the invention. For example, although in the preferred embodiment the piston member and the cylinder member have a circular cross section, it could be seen that any uniform cross section could be utilized although it is expected that sealing can be more easily provided with the design shown in the preferred embodiment. Additionally, while the extension is shown to be threadedly received within the rod, the extension might be integrally formed therewith to cause the intermediate portion to actually be a portion of the rod proper. Similarly, various configurations might be utilized for coupling the shaft to the cylinder member and one alternative might include a rigid attachment thereto if it is determined that the alignment problem mentioned hereinabove is not significant. Clearly, other embodiments of the device taught herein could be employed while remaining within the scope of the present invention.

We claim:

1. A device for operably coupling a first rod to a second rod having a common axis and being capable of movement along said axis for transmitting tensile and compression forces therebetween, said device comprising:

an extension of said first rod having an intermediate portion with an exterior surface which is parallel with said axis and an end portion extending radially from said exterior surface to define a piston member;

a cylinder member mounted at an end of said second rod and including a cylindrical wall that extends by said piston member for sliding, sealed contact therebetween, said cylinder member having an end thereof remote from said second rod which includes an opening therethrough;

said intermediate portion of said extension being received within said opening for sliding, sealed contact between said exterior surface and an interior surface of said opening;

said extension of said first rod and said cylinder member having mating surfaces thereon transverse to said axis capable of engagement therebetween to establish a maximum axial distance between said first rod and said second rod and for transmitting tensile force on one of said rods directly to the other of said rods;

a chamber within said cylinder member defined by said cylindrical wall, said end of said cylinder, said exterior surface and a first side of said piston member;

said piston member having a second side capable of engaging a contacting surface relative to said end of said second rod for transmitting compression force on one of said rods directly to the other of said rods and to establish a minimum axial distance between said first rod and said second rod; and means for filling said chamber with pressurized compressible fluid for biasing said first rod toward said second rod and for limiting tensile force being transmitted from said first rod to said second rod when a relative distance therebetween is less than said maximum axial distance and greater than said minimum axial distance.

2. A device as set forth in claim 1, further including means for allowing limited transverse movement of said end of said second rod relative to said cylinder member to insure said first rod and said second rod can be maintained at said common axis.

3. A device as set forth in claim 1, wherein said mating surfaces of said extension and said cylinder member include an axial space therebetween which is less than an axial space between said first side of said piston and said end of said cylinder member when said first rod and said second rod are positioned with said minimum axial distance therebetween.

4. A device as set forth in claim 1, further including said extension having a sealed interior cavity with a predetermined, fixed volume communicating with said chamber to be capable of allowing said pressurized compressible fluid to flow between said chamber and said cavity.

5. A device as set forth in claim 4, wherein said mating surfaces of said extension and said cylinder member are respectively said first side of said piston member and an interior surface of said end of said cylinder member.

* * * * *